(12) United States Patent
Kimura et al.

(10) Patent No.: US 7,776,953 B2
(45) Date of Patent: Aug. 17, 2010

(54) ROOM TEMPERATURE-CURABLE ORGANOPOLYSILOXANE COMPOSITION

(75) Inventors: Tsuneo Kimura, Annaka (JP); Masaya Ueno, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 519 days.

(21) Appl. No.: 11/806,775

(22) Filed: Jun. 4, 2007

(65) Prior Publication Data

US 2007/0282061 A1  Dec. 6, 2007

(30) Foreign Application Priority Data

Jun. 5, 2006  (JP) ............................. 2006-155823

(51) Int. Cl.
  *C08L 83/04* (2006.01)
(52) U.S. Cl. ......................................... 524/588; 528/34
(58) Field of Classification Search .................. 524/588; 528/34
See application file for complete search history.

(56) References Cited

FOREIGN PATENT DOCUMENTS

| EP | 1104787 A2 | | 11/2000 |
|---|---|---|---|
| JP | 39-27643 B | | 12/1939 |
| JP | 55-43119 A | | 3/1980 |
| JP | 7-39547 B2 | | 5/1995 |
| JP | 2001-152020 A | | 6/2001 |
| JP | 2005 220215 | * | 8/2005 |

* cited by examiner

*Primary Examiner*—Kuo-Liang Peng
(74) *Attorney, Agent, or Firm*—Birch, Stewart, Kolasch & Birch LLP

(57) ABSTRACT

A room temperature-curable organopolysiloxane composition is provided. The composition comprises
  (A) 100 parts by weight of a organopolysiloxane represented by the following general formula (1):

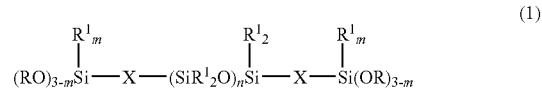

wherein R is a monovalent hydrocarbon group containing 1 to 5 carbon atoms, $R^1$ is independently a substituted or unsubstituted monovalent hydrocarbon group containing 1 to 10 carbon atoms; n is an integer of at least 10; X is oxygen atom or an alkylene group containing 2 to 5 carbon atoms, and m is independently an integer of 0 or 1; or a mixture of such organopolysiloxane;
  (B) 50 to 150 parts by weight of a colloidal calcium carbonate having a specific surface area measured by BET method of at least 10 $m^2/g$;
  (C) 100 to 200 parts by weight of a heavy calcium carbonate having a specific surface area measured by BET method of up to 8 $m^2/g$;
  (D) 1 to 25 parts by weight of an organosilicon compound having at least 3 hydrolyzable groups bonded to silicon atom in one molecule represented by
  $R^2_a Si(OR^3)_{4-a}$
wherein $R^2$ is a monovalent hydrocarbon group containing 1 to 12 carbon atoms, $R^3$ is a monovalent hydrocarbon group containing 1 to 5 carbon atoms, and a is 0 or 1; or its partial hydrolysate; and
  (E) 0.01 to 10 parts by weight of a curing catalyst. The mass ratio of the component (B) to the component (C) is less than 1.

4 Claims, No Drawings

ROOM TEMPERATURE-CURABLE ORGANOPOLYSILOXANE COMPOSITION

CROSS-REFERENCE TO RELATED APPLICATION

This non-provisional application claims priority under 35 U.S.C. §119(a) on Patent Application No. 2006-155823 filed in Japan on Jun. 5, 2006, the entire contents of which are hereby incorporated by reference.

TECHNICAL FIELD

This invention relates to a room temperature-curable organopolysiloxane which cures by reacting with moisture in the air to form a rubber elastomer, and more specifically, to a room temperature-curable organopolysiloxane composition which is capable of providing a rubber elastomer which exhibits good adhesion to resin substrates whose adhesion has been difficult and which also exhibits excellent durable adhesion.

BACKGROUND ART

Various types of room temperature-curable organopolysiloxane compositions which cure at room temperature to form an elastomer by contacting with moisture in air have been known in the art. Among these, room temperature-curable organopolysiloxane compositions of alcohol-releasing type which cure by releasing an alcohol have been the favorite choice for sealants of building applications and in the sealing of electric and electronic components as well as for use in adhesive and coating applications since the compositions of this type are free from unpleasant odors and corrosion of metals.

Typical example of such organopolysiloxane composition is the one disclosed in JP-B 39-27643 (Patent Document 1) which is a composition comprising a organopolysiloxane endcapped with hydroxy group, an alkoxysilane, and an organotitanium compound. JP-A 55-43119 (Patent Document 2) discloses a composition comprising a organopolysiloxane endcapped with an alkoxy silyl group, an alkoxysilane, and an alkoxy titanium. JP-B 7-39547 (Patent Document 3) discloses a composition comprising a organopolysiloxane endcapped with an alkoxy silyl group containing silethylene group, an alkoxysilane, and an alkoxy titanium. With regard to adhesiveness, JP-A 2001-152020 (Patent Document 4) proposes a sealant having excellent durable glass adhesion which incorporates 50 to 200 parts by weight of a light calcium carbonate having a specific surface area measured by BET method of at least 10 m²/g and 1 to 100 parts by weight of a heavy calcium carbonate having a specific surface area measured by BET method of up to 8 m²/g in relation to 100 parts by weight of the base polymer.

In the meanwhile, resins used in the casing and other components of the electric and electronic products have experienced improvement in their durability, and in the case of such resin, adhesion of the resin with conventional sealant is often difficult, and the compositions as described above which have been used as a sealant in building applications, and in the sealing, bonding, and coating of electric and electronic components failed to exhibit sufficient adhesion to such resin.

DISCLOSURE OF THE INVENTION

The present invention has been achieved in view of the situation as described above, and an object of the present invention is to provide a room temperature-curable organopolysiloxane composition which is adapted for use as a cured product exhibiting excellent adhesion to resins whose adhesion has been difficult, which can be used for bonding and fixing of the electric and electronic components.

In order to achieve such object, the inventors of the present invention made an intensive study and found that a organopolysiloxane composition which exhibits an excellent storage stability as well as a remarkably improved adhesion to resins whose adhesion has been difficult can be realized by using a organopolysiloxane having an alkoxysilyl group on both ends for the base polymer, and blending a curing agent, a filler, a titanium chelate catalyst, and a silane coupling agent with such polymer, and using a particular amount of calcium carbonate for the filler. The present invention has been completed on the bases of such finding.

Accordingly, the present invention provides a room temperature-curable organopolysiloxane composition comprising (A) 100 parts by weight of a organopolysiloxane represented by the following general formula (1):

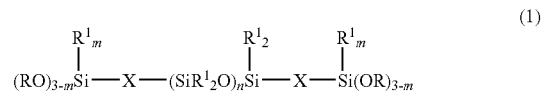

wherein R is a monovalent hydrocarbon group containing 1 to 5 carbon atoms, $R^1$ is independently a substituted or unsubstituted monovalent hydrocarbon group containing 1 to 10 carbon atoms; n is an integer of at least 10; X is oxygen atom or an alkylene group containing 2 to 5 carbon atoms, and m is independently an integer of 0 or 1; or a mixture of such organopolysiloxane;

(B) 50 to 150 parts by weight of a colloidal calcium carbonate having a specific surface area measured by BET method of at least 10 m²/g;

(C) 100 to 200 parts by weight of a heavy calcium carbonate having a specific surface area measured by BET method of up to 8 m²/g;

(D) 1 to 25 parts by weight of an organosilicon compound having at least 3 hydrolyzable groups bonded to silicon atom in one molecule represented by $R^2{}_a Si(OR^3)_{4-a}$ wherein $R^2$ is a monovalent hydrocarbon group containing 1 to 12 carbon atoms, $R^3$ is a monovalent hydrocarbon group containing 1 to 5 carbon atoms, and a is 0 or 1; or it partial hydrolysate; and (E) 0.01 to 10 parts by weight of a curing catalyst; wherein
mass ratio of the component (B) to the component (C) is less than 1.

EFFECTS OF THE INVENTION

The present invention is capable of forming a rubber elastomer which exhibits excellent adhesion to resins whose adhesion have been difficult, for example, acrylic resin, ABS resin, polycarbonate, polyamide, polybutylene terephthalate, and polyphenylene sulfide.

DESCRIPTION OF THE PREFERRED EMBODIMENTS

Component (A)

In the general formula (1) representing the organopolysiloxane which is the component (A) in the present invention, R is a monovalent hydrocarbon group containing 1 to 5 carbon atoms, for example, an alkyl group such as methyl group, ethyl group, n-propyl group, isopropyl group, butyl group, or pentyl group. The plurality of R in the formula may be either the same or different, and R is preferably methyl group or ethyl group in view of reactivity in the hydrolysis. $R^1$ is independently a substituted or unsubstituted monovalent hydrocarbon group containing 1 to 10 carbon atoms, for example, an alkyl group such as methyl group, ethyl group, or propyl group; a cycloalkyl group such as cyclohexyl group; an alkenyl group such as vinyl group and allyl group; an aryl group such as phenyl group and tolyl group; or any of such groups having the hydrogen atoms partially substituted with a halogen atom, for example, 3,3,3-trifluoropropyl group. The plurality of $R^1$ in the formula may be either the same or different. n is an integer of at least 10, and in particular, an integer of the value which realizes the viscosity at 25° C. of the dipolydiorganosiloxane in the range of 25 to 500,000 mPa·s, and preferably in the range of 500 to 100,000 mPa·s. X is oxygen atom or an alkylene group containing 2 to 5 carbon atoms, for example, ethylene group, propylene group, or butylene group. m is independently an integer of 0 or 1. The viscosity is the value measured with a rotational viscometer.

Component (B)

The component (B) is a colloidal calcium carbonate having a specific surface area measured by BET method of at least 10 m²/g, and in particular, 12 to 30 m²/g. This component is a filler which imparts the composition of the present invention with rubbery physical property and thixotropy. Most preferable for use as the component (B) is a colloidal calcium carbonate which has been surface treated with a fatty acid, a fatty acid salt, or a fatty acid ester by the method commonly used in the art.

The component (B) is used at a content of 50 to 150 parts by weight, and preferably 70 to 120 parts by weight in relation to 100 parts by weight of component (A). When used at less than 50 parts by weight, the intended bond strength is not realized due to the insufficient strength of the rubber, and use in excess of 150 parts by weight results in the increased viscosity of the material, and hence, in the reduced workability.

Component (C)

The component (C) is a heavy calcium carbonate having a specific surface area measured by BET method of up to 8 m²/g, and in particular, 0.5 to 6 m²/g. This component is a filler which imparts the composition of the present invention with adhesive property and high injection property. While the component (C) most typically a surface-untreated heavy calcium carbonate, also preferable is use of a heavy calcium carbonate having its surface treated with a fatty acid or paraffin by the method commonly used in the art.

The component (C) is typically used at 100 to 200 parts by weight, preferably at 100 to 150 parts by weight, and more preferably at 105 to 150 parts by weight in relation to 100 parts by weight of the component (A). When used at less than 100 parts by weight, adhesiveness to the resin will be insufficient, and use in excess of 200 parts by weight will results in the increased flowability, and hence, reduced workability.

In the present invention, the component (B) and the component (C) are incorporated such that the mass ratio of (B)/(C) is less than 1, more preferably 0.25≦(B)/(C)≦0.95, still more preferably 0.3≦(B)/(C)≦0.9, and most preferably 0.35≦(B)/(C)≦0.85. In other words, incorporation of the component (C) at a content higher than that of the component (B) is necessary. Incorporation of the component (B) at a content higher than that of the component (C) will invite loss of adhesiveness to resins whose adhesion have been difficult.

The JP-A 2001-152020 (Patent Document 4) as mentioned above discloses a room temperature curable silicone rubber composition comprising (A) 100 parts by weight of dipolydiorganosiloxane having at the end of its molecular chain an organic group represented by the general formula:

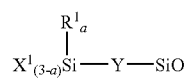

Wherein $R^1$ is a monovalent hydrocarbon group, $X^1$ is a hydrolyzable group, Y is a divalent hydrocarbon group, oxygen atom, or an organic group represented by the general formula:

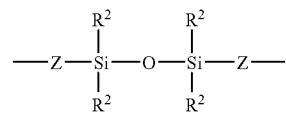

wherein Z is a divalent hydrocarbon group, and a is 0, 1, or 2, said dipolydiorganosiloxane having a viscosity at 25° C. of 20 to 1,000,000 mPa·s;

(B) 50 to 200 parts by weight of a light calcium carbonate having a specific surface area measured by BET method of at least 10 m²/g;

(C) 1 to 100 parts by weight of a heavy calcium carbonate having a specific surface area measured by BET method of up to 8 m²/g;

(D) 1 to 25 parts by weight of a hydrolyzable group-containing silane represented by the general formula:

wherein $R^3$ is a monovalent hydrocarbon group, $X^2$ is a hydrolyzable group, and b is 0 or 1, or its partial hydrolysis and condensation product; and (E) 0.01 to 10 parts by weight of a curing catalyst. In this prior art silicone rubber composition, however, the component (C) is incorporated at a low content which is lower than the content of the component (B). Such low content of the component (C) which is lower than that of the component (B) results in the inferior adhesion of the silicone rubber composition to the resins whose adhesion have been difficult such as acrylic resin, ABS resin, and polyamide resin.

In the present invention, the component (B) and the component (C) used may be commercially available products. Exemplary products which may be used as component (B) include Carlex 300, MT-100, Sealet 700, Kalfain N350, and Kalfain 100 (which are manufactured by Maruo Calcium Co., Ltd.) and Hakuenka U and Hakuenka CCR (which are manufactured by Shiraishi Calcium Kaisha, Ltd.). Exemplary products which may be used as component (C) include Super 2000, Super 2300, MC Coat S20, and MC Coat P20 (which are manufactured by Maruo Calcium Co., Ltd.) and Whiton P-10 and Whiton SSB (which are manufactured by Shiraishi Calcium Kaisha, Ltd.).

Component (D)

The component (D) is an organosilicon compound having at least 3 hydrolyzable groups bonded to silicon atom in one molecule or its partial hydrolysate, and exemplary hydrolyzable groups in such organosilicon compound or its partial hydrolysate include ketoxime group, alkoxy group, acetoxy group, and isopropenoxy group. Preferably, the hydrolyzable group is an alkoxy group as in the case of the terminal group of the component (A).

Examples of component (D) include ketoxime silanes such as tetrakis(methyl ethyl ketoxime)silane, methyl tris(dimethyl ketoxime)silane, methyltris(methyl ethyl ketoxime)silane, ethyltris(methyl ethyl ketoxime)silane, methyltris(methyl isobutyl ketoxime)silane, and vinyl tris(methyl ethyl ketoxime)silane; alkoxysilanes such as methyltrimethoxysilane, vinyltrimethoxysilane, phenyltrimethoxysilane, and vinyltriethoxysilane; acetoxy silanes such as methyltriacetoxysilane and vinyltriacetoxysilane; isopropenoxy silanes such as methyltriisopropenoxysilane, vinyltriisopropenoxysilane, and phenyltriisopropenoxysilane; and partial hydrolysis and condensation products of such silane.

Component (D) may be used at a content in the range of 1 to 25 parts by weight, and preferably at 2 to 10 parts by weight in relation to 100 parts by weight of the component (A). Sufficient crosslinking is not achieved and the composition having the rubber elasticity of the intended level will not be produced when used at less than 1 part by weight, and use in excess of 25 parts by weight is likely to invite loss of mechanical properties of the cured product.

Component (E)

The component (E) used in the present invention is the catalyst incorporated for the curing of the composition of the present invention, and examples include organotitanium compounds such as tetraisopropoxy titanium, tetra-t-butoxy titanium, titanium di(isopropoxy)bis(ethylacetoacetate), and titanium di(isopropoxy)bis(acetylacetoacetate); organotin compounds dibutyltin dilaurate, dibutyltin bisacetylacetoacetate, and tin octylate; metal dicarboxylate such as lead dioctylate; organozirconium compounds such as zirconium tetraacetyl acetonate; organoaluminium compound such as aluminum triacetyl acetonate; and amines such as hydroxylamine and tributylamine. Among these, the preferred is organotitanium compound, and in view of realizing the improved adhesion and storage stability of the present composition, the most preferred are titanate esters and titanium chelate catalysts. Examples of the component (E) include diisopropoxybis(ethyl acetoacetate)titanium, diisopropoxybis(acetylacetone)titanium, dibutoxybis(methyl acetoacetate)titanium, and those represented by the following formulae:

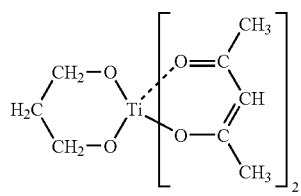

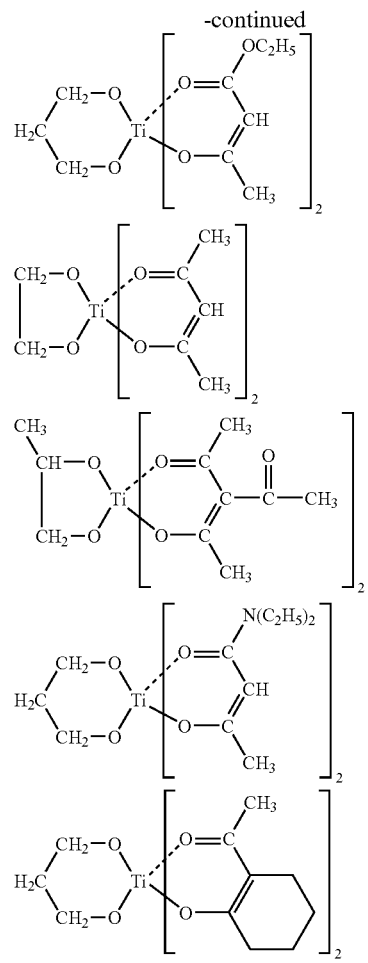

Component (E) may be used at a catalytic amount, and typically, at 0.01 to 10 parts by weight, and preferably at 0.05 to 7 parts by weight in relation to 100 parts by weight of component (A). When the component (E) is used at an excessively small amount, the composition of the present invention will have an insufficient curability, while excessive use may invite loss of storage stability.

Other Components

The composition may further contain additives or catalysts commonly used in the art as long as curability at room temperature or self-adhesiveness are not adversely affected. Exemplary such additives include plasticizers such as silicone oil and isoparaffin, and optionally added thixotropic agents such as polyether, colorants such as pigments and dyes, heat resistance improver such as iron red and cerium oxide, cold resistance improver, anticorrosive, and oil resistance improver such as potassium methacrylate, and also optionally added antimold and antifungal agent. The composition may also include a solvent such as toluene, xylene, volatile oil, cyclohexane, methylcyclohexane, or low boiling isoparaffin.

The room temperature-curable organopolysiloxane composition of the present invention cures by reacting with the moisture in air. The composition typically becomes a rubber elastomer when left in the atmosphere at 0 to 50° C. for 0.5 to 7 days.

Accordingly, the organopolysiloxane composition of the present invention is well adapted for use as a sealant for acrylic resin, polycarbonate, and the like, and in bonding and fixing of electric and electronic components, for example, in protecting electrodes of a flat panel display, fixing electrode box of a solar cell, in sealing automobile lamps, and sealing automobile ECU case, and in particular, for use as an adhesive with resins whose adhesion has been difficult such as acrylic resin, ABS resin, polycarbonate, polyamide, polybutylene terephthalate (PBT), and polyphenylene sulfide (PPS).

EXAMPLES

Next, the present invention is described in further detail by referring to Examples and Comparative Examples, which by no means limit the scope of the present invention.

Example 1

To a mixture of 100 parts by weight of polydimethylsiloxane endcapped with trimethoxysiloxy group having a viscosity at 23° C. of 50,000 mPa·s and 100 parts by weight of polydimethylsiloxane endcapped with trimethoxysiloxy group having a viscosity at 23° C. of 5000 mPa·s were added 90 parts by weight of colloidal calcium carbonate surface treated with a fatty acid ester (specific surface area 20 m$^2$/g), 110 parts by weight of surface-untreated heavy calcium carbonate (specific surface area 4 m$^2$/g), and 2 parts by weight of fumed silica which had been surface treated with dimethylchlorosilane, and the mixture was mixed in a blender. To this mixture, 3 parts by weight of methyltrimethoxysilane, 2.5 part by weight of diisopropoxybis(ethyl acetoacetate)titanium, and 0.5 parts by weight of a reaction product of γ-methacryloxy propyl trimethoxysilane and γ-aminopropyltrimethoxysilane and the mixture was fully mixed under reduced pressure to produce composition 1.

Example 2

Composition 2 was obtained by using 100 parts by weight of polydimethylsiloxane endcapped with trimethoxysiloxy group having a viscosity at 23° C. of 50,000 mPa·s instead of the 100 parts by weight of polydimethylsiloxane endcapped with trimethoxysylethylene group having a viscosity at 23° C. of 30,000 mPa·s.

Comparative Example 1

The procedure of Example 1 was repeated except that 90 parts by weight of colloidal calcium carbonate surface treated with a fatty acid ester and 110 parts by weight of surface untreated heavy calcium carbonate were replaced with 140 parts by weight of colloidal calcium carbonate surface treated with a fatty acid ester and 60 parts by weight of surface-untreated heavy calcium carbonate to produce composition 3.

Comparative Example 2

The procedure of Example 1 was repeated except that 90 parts by weight of colloidal calcium carbonate surface treated with a fatty acid ester and 110 parts by weight of surface untreated heavy calcium carbonate were replaced with 200 parts by weight of colloidal calcium carbonate surface treated with a fatty acid ester to produce composition 4.

Comparative Example 3

The procedure of Example 1 was repeated except that 90 parts by weight of colloidal calcium carbonate surface treated with a fatty acid ester and 110 parts by weight of surface untreated heavy calcium carbonate were replaced with 110 parts by weight of colloidal calcium carbonate surface treated with a fatty acid ester and 90 parts by weight of surface-untreated heavy calcium carbonate to produce composition 5.

The silicone rubber composition prepared as described above was cast in a 2 mm frame, and allowed to cure at a temperature of 23° C. and a relative humidity of 50% for 7 days to produce a rubber sheet having a thickness of 2 mm. This rubber sheet was evaluated for its physical properties according to JIS K6249. The results are shown in Table 1. A test piece for evaluating shear bond strength was prepared by using resin plates (acrylic resin, ABS resin, and polyamide resin) having a width of 25 mm and a length of 100 mm. This test piece had a bonding area of 2.5 mm$^2$ and bonding thickness of 2 mm, and the test piece was allowed to cure at a temperature of 23° C. and a relative humidity of 50% for 7 days to confirm its shear bond strength and area percentage of cohesive failure. The results are also shown in Table 1.

TABLE 1

|  |  | Example | | Comparative Example | | |
|---|---|---|---|---|---|---|
|  |  | 1 | 2 | 1 | 2 | 3 |
| Physical properties | Hardness (Durometer A) | 22 | 28 | 21 | 25 | 22 |
|  | Elongation at break (%) | 610 | 550 | 710 | 840 | 650 |
|  | Tensile strength (MPa) | 2.1 | 2.7 | 2.1 | 2.2 | 2.0 |
| Resin adhesion | Shear bond strength of acryl (MPa) | 1.2 | 1.1 | 0.4 | 0.2 | 0.5 |
|  | Cohesive failure of acryl (%) | 100 | 100 | 20 | 0 | 20 |
|  | Shear bond strength of ABS (MPa) | 1.1 | 1.3 | 0.5 | 0.3 | 0.8 |
|  | Cohesive failure of ABS (%) | 100 | 100 | 50 | 10 | 60 |
|  | Shear bond strength of Nylon 6 (MPa) | 1.2 | 1.1 | 0.4 | 0.3 | 0.6 |
|  | Cohesive failure of Nylon 6 (%) | 100 | 100 | 50 | 10 | 60 |
|  | Shear bond strength of Nylon 66 (MPa) | 1.3 | 1.5 | 0.2 | 0.3 | 0.3 |
|  | Cohesive failure of Nylon 66 (%) | 100 | 100 | 30 | 0 | 30 |
|  | Shear bond strength of glass (MPa) | 1.5 | 1.6 | 1.5 | 1.6 | 1.5 |
|  | Cohesive failure of glass (%) | 100 | 100 | 100 | 100 | 100 |

Japanese Patent Application No. 2006-155823 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A room temperature-curable organopolysiloxane composition comprising
  (A) 100 parts by weight of an organopolysiloxane represented by the following general formula (1):

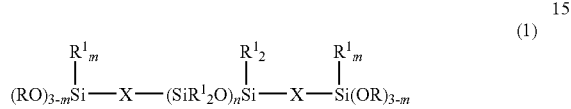

wherein R is a monovalent hydrocarbon group containing 1 to 5 carbon atoms, $R^1$ is independently a substituted or unsubstituted monovalent hydrocarbon group containing 1 to 10 carbon atoms; n is an integer of at least 10; X is oxygen atom or an alkylene group containing 2 to 5 carbon atoms, and m is independently an integer of 0 or 1; or a mixture of such organopolysiloxane;
  (B) 50 to 150 parts by weight of a colloidal calcium carbonate having a specific surface area measured by BET method of at least 10 $m^2/g$;
  (C) 100 to 200 parts by weight of a heavy calcium carbonate having a specific surface area measured by BET method of up to 8 $m^2/g$;
  (D) 1 to 25 parts by weight of an organosilicon compound having at least 3 hydrolyzable groups bonded to silicon atom in one molecule represented by

wherein $R^2$ is a monovalent hydrocarbon group containing 1 to 12 carbon atoms, $R^3$ is a monovalent hydrocarbon group containing 1 to 5 carbon atoms, and a is 0 or 1; or its partial hydrolysate; and
  (E) 0.01 to 10 parts by weight of a titanium chelate catalyst; wherein mass ratio of the component (B) to the component (C) is less than 1, wherein the component (B) and the component (C) are incorporated such that the mass ratio of (B)/(C) is $0.35 \leq (B)/(C) \leq 0.85$.

2. The room temperature-curable organopolysiloxane composition according to claim 1 wherein the R in the component (A) is methyl group or ethyl group.

3. The room temperature-curable organopolysiloxane composition according to claim 1 wherein the composition is adapted for adhesion of acrylic resin, ABS resin, polycarbonate, polyamide, polybuthylene terephthalate, or polyphenylene sulfide.

4. The room temperature-curable organopolysiloxane composition according to claim 1 wherein the titanium chelate catalyst is one selected from the group consisting of the following compounds:

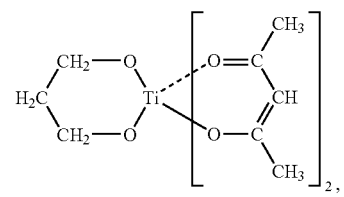

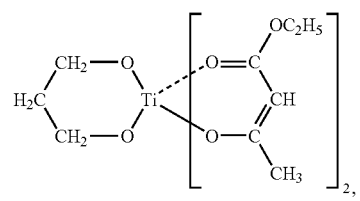

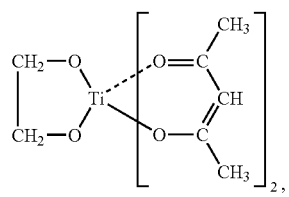

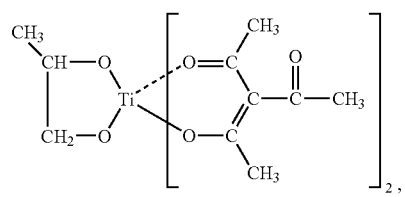

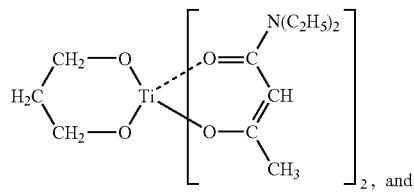, and

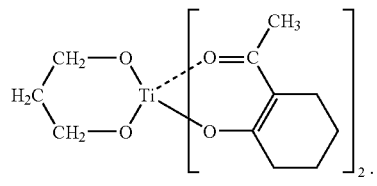.

* * * * *